United States Patent
Tucker, II

(10) Patent No.: US 7,659,226 B2
(45) Date of Patent: Feb. 9, 2010

(54) PROCESS FOR MAKING PHOTOCATALYTIC MATERIALS

(75) Inventor: Gary D. Tucker, II, Manchester, CT (US)

(73) Assignee: EnVont LLC, Naples, FL (US)

( * ) Notice: Subject to any disclaimer, the term of this patent is extended or adjusted under 35 U.S.C. 154(b) by 210 days.

(21) Appl. No.: 11/679,058

(22) Filed: Feb. 26, 2007

(65) Prior Publication Data

US 2008/0207440 A1  Aug. 28, 2008

(51) Int. Cl.
B01J 23/00 (2006.01)
(52) U.S. Cl. .................... 502/300; 502/350
(58) Field of Classification Search .............. None
See application file for complete search history.

(56) References Cited

U.S. PATENT DOCUMENTS

| | | | |
|---|---|---|---|
| 4,820,748 A | 4/1989 | Yamamori et al. | |
| 5,403,513 A | 4/1995 | Sato et al. | |
| 5,759,251 A | 6/1998 | Nakamura et al. | |
| 5,939,194 A | 8/1999 | Hashimoto et al. | |
| 6,013,372 A | 1/2000 | Hayakawa et al. | |
| 6,090,489 A | 7/2000 | Hayakawa et al. | |
| 6,099,969 A | 8/2000 | Ogata | |
| 6,107,241 A * | 8/2000 | Ogata et al. | 423/610 |
| 6,235,401 B1 | 5/2001 | Ogata et al. | |
| 6,344,277 B1 | 2/2002 | Ogata et al. | |
| 6,344,278 B1 | 2/2002 | Ogata et al. | |
| 6,379,811 B2 | 4/2002 | Ogata et al. | |
| 6,420,437 B1 | 7/2002 | Mori et al. | |
| 6,429,169 B1 | 8/2002 | Ichinose | |
| 6,524,664 B1 | 2/2003 | Hashimoto et al. | |
| 6,565,641 B1 | 5/2003 | Isozaki | |
| 6,602,918 B1 | 8/2003 | Ichinose | |
| 6,733,580 B2 | 5/2004 | Isozaki | |
| 6,736,890 B2 | 5/2004 | Haruta et al. | |
| 6,770,257 B1 | 8/2004 | Imura et al. | |
| 6,830,785 B1 | 12/2004 | Hayakawa et al. | |
| 6,884,752 B2 * | 4/2005 | Andrews | 502/350 |
| 7,090,823 B1 | 8/2006 | Liu | |
| 7,175,825 B2 | 2/2007 | Nakano et al. | |
| 7,205,049 B2 | 4/2007 | Andrews | |

(Continued)

FOREIGN PATENT DOCUMENTS

CN  1253119 A  *  5/2000

(Continued)

OTHER PUBLICATIONS

Ichinose et al., "Properties of Anatase Films for photocatlyst from peroxotitanic acid solution and peroxo-Modified Anatase sol", J. Cer. Soc: of Japan, International Edition, Vo. 104, No. 10, (Oct. 1996) pp. 909-912.

(Continued)

Primary Examiner—Melvin C Mayes
Assistant Examiner—Melissa Stalder
(74) Attorney, Agent, or Firm—Fish & Richardson P.C.

(57) ABSTRACT

A method of making amorphous metal peroxide solution includes mixing hydrogen peroxide and an amorphous metal hydroxide mixture to form a hydrogen peroxide and amorphous metal hydroxide mixture, and simultaneously heating and applying pressure above atmospheric pressure to the hydrogen peroxide and amorphous metal hydroxide mixture for a period of time to form the amorphous metal peroxide solution.

27 Claims, 2 Drawing Sheets

U.S. PATENT DOCUMENTS

| | | |
|---|---|---|
| 7,261,942 B2 | 8/2007 | Andrews |
| 7,294,365 B2 | 11/2007 | Hayakawa et al. |
| 7,303,738 B2 | 12/2007 | Okusako |
| 7,419,718 B2 | 9/2008 | Ogata et al. |
| 2002/0016250 A1 | 2/2002 | Hayakawa et al. |
| 2005/0147759 A1 | 7/2005 | Andrews |
| 2005/0271892 A1 | 12/2005 | Ogata et al. |
| 2005/0279255 A1 | 12/2005 | Suzuki et al. |
| 2007/0248790 A1 | 10/2007 | Ogata |
| 2008/0035025 A1 | 2/2008 | Andrews |
| 2008/0166478 A1 | 7/2008 | Kameshima et al. |
| 2008/0241557 A1 | 10/2008 | Hoshi et al. |

FOREIGN PATENT DOCUMENTS

| | | |
|---|---|---|
| EP | 0846494 | 6/1998 |
| EP | 0854112 | 7/1998 |
| EP | 1310579 | 5/2003 |
| EP | 0816466 | 5/2006 |
| EP | 1873218 | 1/2008 |
| JP | 9071418 | 3/1997 |
| JP | 9227159 | 9/1997 |
| JP | 10067516 | 3/1998 |
| JP | 10156999 | 6/1998 |
| JP | 2000247639 | 9/2000 |
| JP | 2001048538 | 1/2001 |
| JP | 2007118556 | 5/2007 |
| KR | 2005050740 A * | 6/2005 |

OTHER PUBLICATIONS

Ichinose et al., "Synthesis of peroxo-Modified Anatase sol from peroxo Titanic Acid Solution", Journal of the Ceramic Society of Japan, International Edition, vol. 104, No. 8, (Aug. 1996) pp. 697-700.

Chemical Abstracts, vol. 120, No. 8, Feb. 21, 1994 Columbus, Ohio, US; FANG: XP002139805 *abstract* & Wuhan Daxue Xueba, Ziran Kexubean, vol. 3, 1992, pp. 78-82, china, AN 120: 80604.

Chemical Abstracts, vol. 108, No. 14, Apr. 4, 1988 Columbus, Ohio, US; Abstract No. 115112, Sato, Goro: XP002139806 *abstract* & JP 62 283817 A (Catalyst and Chemicals Industries).

Katzoff, S., et al., "The Solution of Titanic Hydroxide in Hydrogen Peroxide," J. Am. Chem. Soc., vol. 57, No. 7, p. 1384, 1935.

Ichinose, Hiromichi, "Properties of Peroxotitanium Acid Solution and Peroxo-Modified Anatase Sol Derived From Peroxotitanium Hydrate," J. Sol-Gel Sci. & Tech., vol. 22, 2001, pp. 33-40.

International Search Report and Written Opinion, International Application No. PCT/US2008/053542, dated Mar. 6, 2009, 16 pages.

Walcarius, A., Electrochemical Applications of Silica-Based Organic Inorganic Hybrid Materials; Chemistry of Materials, Oct. 2001, vol. 13, No. 10, pp. 3351-3372.

Korean Examiner Lee, Byong Jin, International Search Report and Written Opinion, International Application No. PCT/US2008/087823, dated Jul. 15, 2009, 13 pages.

* cited by examiner

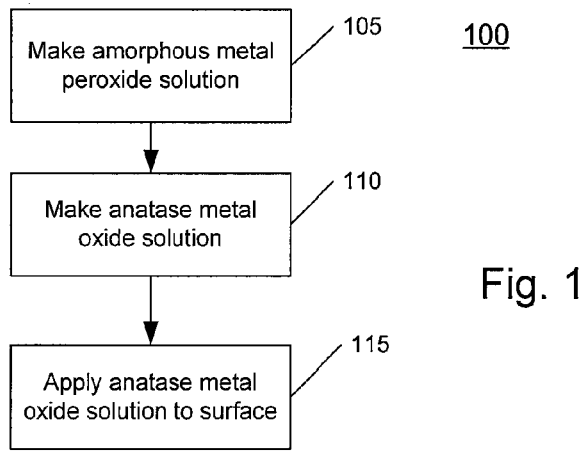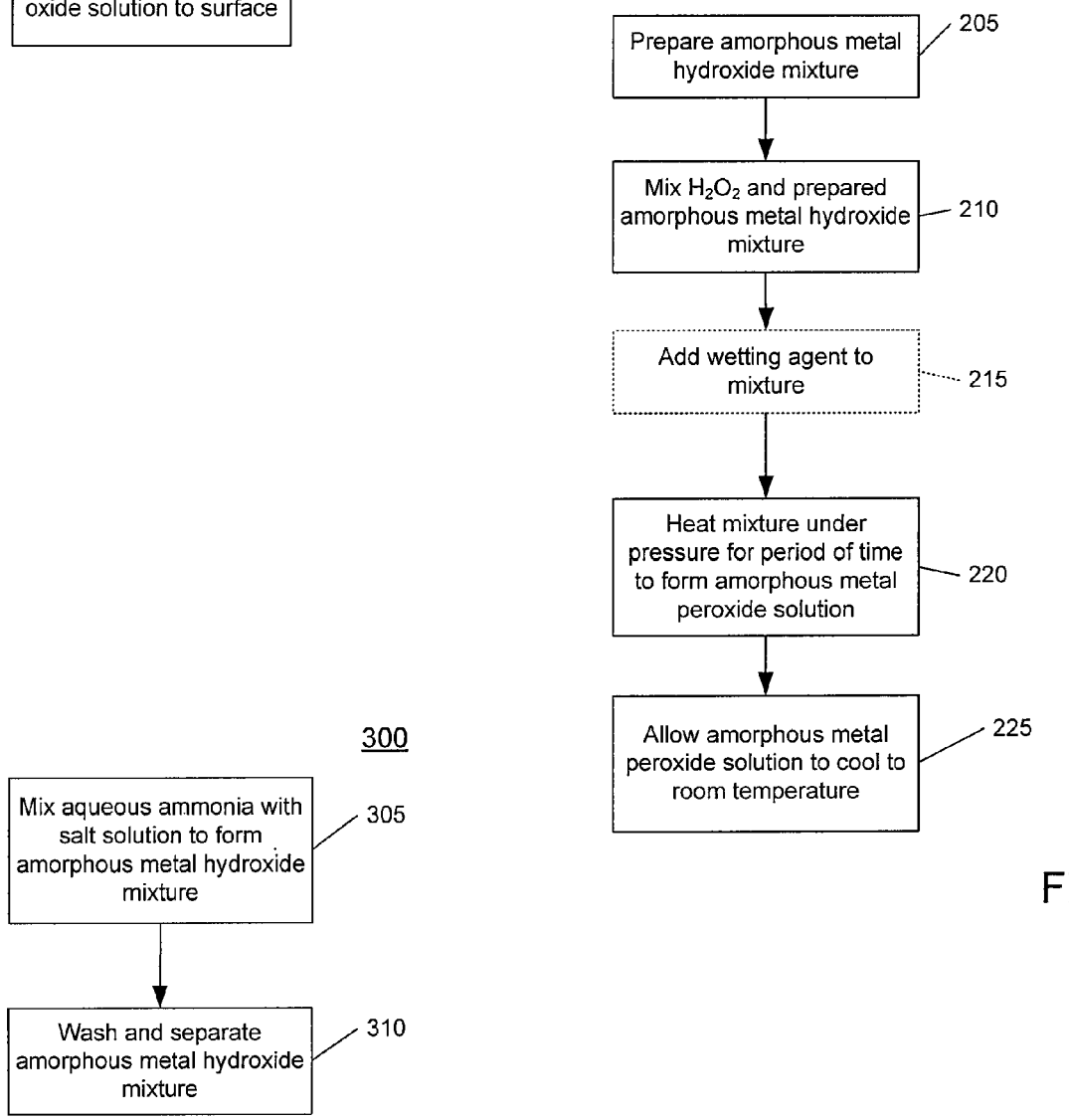

PROCESS FOR MAKING PHOTOCATALYTIC MATERIALS

TECHNICAL FIELD

This description relates to a process for making metal oxide solutions for photocatalytic materials.

BACKGROUND

Photocatalytic coatings including a photocatalytically active oxide of a transition metal (MO) or ($MO_2$) such as titanium oxide ($TiO_2$) or zirconium oxide ($ZrO_2$) can be used for producing self-cleaning coatings on a surface such as a glass windows.

SUMMARY

In one general aspect, an amorphous metal peroxide solution is made by mixing hydrogen peroxide and a prepared amorphous metal hydroxide mixture to form a hydrogen peroxide and amorphous metal hydroxide mixture, and simultaneously heating and applying pressure above atmospheric pressure to the hydrogen peroxide and amorphous metal hydroxide mixture for a period of time to form the amorphous metal peroxide solution.

Implementations can include one or more of the following features. For example, the method can include preparing the amorphous metal hydroxide mixture. The amorphous metal hydroxide mixture can be prepared by mixing aqueous ammonia to a salt solution of the metal to form an amorphous metal hydroxide, and washing and separating the amorphous metal hydroxide.

The method can include adding a wetting agent to the hydrogen peroxide and amorphous metal hydroxide mixture prior to the simultaneous heating and application of pressure to form a hydrogen peroxide/amorphous metal hydroxide/wetting agent mixture.

Simultaneously heating and applying pressure above atmospheric pressure can include heating the hydrogen peroxide and amorphous metal hydroxide mixture to a temperature between about 90° C. and about 250° C.

The method can include agitating the hydrogen peroxide and amorphous metal hydroxide mixture simultaneously with heating and applying pressure to the hydrogen peroxide and amorphous metal hydroxide mixture.

The amorphous metal peroxide solution can be amorphous titanium peroxide solution, and the prepared amorphous metal hydroxide mixture can be a prepared amorphous titanium hydroxide mixture. Simultaneously heating and applying pressure above atmospheric pressure to the hydrogen peroxide and amorphous metal hydroxide mixture for a period of time can include simultaneously heating to a temperature between about 90° C. and about 250° C. and applying pressure for about 1½-2 hours to form the amorphous titanium peroxide solution.

The method can include monitoring a temperature of the hydrogen peroxide and amorphous metal hydroxide mixture while simultaneously heating and applying pressure above atmospheric pressure to the hydrogen peroxide and amorphous metal hydroxide mixture for a period of time. The method can include monitoring a pH level of the hydrogen peroxide and amorphous metal hydroxide mixture while simultaneously heating and applying pressure above atmospheric pressure to the hydrogen peroxide and amorphous metal hydroxide mixture for a period of time.

In another general aspect, a method of making amorphous metal peroxide solution includes mixing hydrogen peroxide, a prepared amorphous metal hydroxide mixture, and a wetting agent to form a hydrogen peroxide/amorphous metal hydroxide/wetting agent mixture, and treating the hydrogen peroxide/amorphous metal hydroxide/wetting agent mixture to form the amorphous metal peroxide solution.

Implementations can include one or more of the following features. For example, treating the hydrogen peroxide/amorphous metal hydroxide/wetting agent mixture can include simultaneously heating and applying pressure above atmospheric pressure to the hydrogen peroxide/amorphous metal hydroxide/wetting agent mixture for a period of time to form the amorphous metal peroxide solution.

The method can include agitating the hydrogen peroxide/amorphous metal hydroxide/wetting agent mixture simultaneously with heating and applying pressure. The method can include preparing the amorphous metal hydroxide mixture.

The amorphous metal hydroxide mixture can be prepared by mixing aqueous ammonia to a salt solution of the metal to form an amorphous metal hydroxide, and washing and separating the amorphous metal hydroxide.

The amorphous metal peroxide solution can be amorphous titanium peroxide solution, and the prepared amorphous metal hydroxide mixture can be a prepared amorphous titanium hydroxide mixture. Simultaneously heating and applying pressure above atmospheric pressure to the hydrogen peroxide/amorphous metal hydroxide/wetting agent mixture for a period of time to form the amorphous metal peroxide solution can include simultaneously heating to a temperature between about 90° C. and about 250° C. and applying pressure for about 1½-2 hours to form the amorphous titanium peroxide solution.

In another general aspect, a method of making anatase metal oxide solution includes preparing amorphous metal peroxide solution, and simultaneously heating and applying pressure above atmospheric pressure to the prepared amorphous metal peroxide solution for a period of time to form the anatase metal oxide solution.

Implementations can include one or more of the following features. For example, preparing the amorphous metal peroxide solution can be prepared by mixing hydrogen peroxide and a prepared amorphous metal hydroxide mixture to form a hydrogen peroxide and amorphous metal hydroxide mixture, and simultaneously heating and applying pressure above atmospheric pressure to the hydrogen peroxide and amorphous metal hydroxide mixture for a period of time to form the amorphous metal peroxide solution.

The method can include preparing the amorphous metal hydroxide solution.

Preparing the amorphous metal peroxide solution can include preparing an amorphous metal hydroxide mixture, mixing hydrogen peroxide and the prepared amorphous metal hydroxide to form a hydrogen peroxide and amorphous metal hydroxide mixture, and treating the hydrogen peroxide and amorphous metal hydroxide mixture to form the amorphous metal peroxide solution. Treating the hydrogen peroxide and amorphous metal hydroxide mixture can include simultaneously heating and applying pressure above atmospheric pressure to the hydrogen peroxide and amorphous metal hydroxide mixture for a period of time to form the amorphous metal peroxide solution. The method can also include adding a wetting agent to the hydrogen peroxide and amorphous metal hydroxide mixture prior to treating. Treating the hydrogen peroxide and amorphous metal hydroxide mixture can include simultaneously heating and applying pressure above atmospheric pressure to the hydrogen peroxide and amorphous metal hydroxide mixture for a period of time to form the amorphous metal peroxide solution.

The amorphous metal peroxide solution can be an amorphous titanium peroxide solution, and the anatase metal oxide solution can be anatase titanium oxide solution.

Simultaneously heating and applying pressure above atmospheric pressure to the prepared amorphous titanium peroxide solution for a period of time to form the anatase titanium oxide solution can include heating the prepared amorphous titanium peroxide solution to a temperature between about 90° C. and about 250° C. under the applied pressure until the anatase titanium oxide solution is formed.

In another general aspect, a method of applying an anatase metal oxide solution to a substrate includes making an amorphous metal peroxide solution, forming an anatase metal oxide solution from the amorphous metal peroxide solution, and applying the anatase metal oxide solution to the substrate. The amorphous metal peroxide solution is made by simultaneously heating and applying pressure above atmospheric pressure to a hydrogen peroxide and amorphous metal hydroxide mixture for a period of time to form the amorphous metal peroxide solution.

Implementations can include one or more of the following features. For example, the anatase metal oxide solution can be applied to the substrate by applying the anatase metal oxide solution as a coating to a surface of the substrate. The anatase metal oxide solution can be applied to the substrate by integrating the anatase metal oxide solution within the substrate. Integrating the anatase metal oxide solution within the substrate can include dispersing the anatase metal oxide solution within the substrate such that the anatase metal oxide solution is distributed throughout the substrate.

The time it takes to produce the amorphous metal peroxide solution is reduced because the mixture of the hydrogen peroxide and the metal hydroxide is heated simultaneously with being pressurized. The reaction does not need to be kept cool and therefore does not need to be slowly and carefully warmed up to ensure that the pH rises slowly and stably enough from the cool temperature.

Similarly, the time it takes to produce the anatase metal oxide solution is reduced because the amorphous metal peroxide solution is heated simultaneously with being pressurized. Time can be reduced to about 3 hours.

Because the wetting agent is introduced to the amorphous metal hydroxide and hydrogen peroxide mixture prior to heating and pressurizing of the mixture, the amorphous metal peroxide solution is more homogenous and therefore provides a better film or coating former. Additionally, the amorphous metal peroxide solution produced in this manner (that is, with the early introduction of the wetting agent) does not need to be intermittently shaken or agitated after formation to maintain its homogeneity. Moreover, the amorphous metal peroxide solution can be applied as a thinner coating at 12 to 18 micron droplets at ranges from 100 nm and higher film thickness regardless of the spray apparatus and the spray application parameters. Moreover, a special apparatus is not needed to apply the amorphous metal peroxide solution to obtain a coating having a thickness of at least 100 nm.

Additionally, because the time needed to complete the reactions involved in forming the solutions is reduced, the cost for producing the amorphous metal peroxide solution and the anatase metal oxide solution is also reduced.

Other features will be apparent from the description, the drawings, and the claims.

DESCRIPTION OF DRAWINGS

FIG. 1 is a flow chart of a procedure for forming anatase metal oxide solution;

FIG. 2 is a flow chart of a procedure for forming an amorphous metal peroxide solution that can be used in the procedure of FIG. 1;

FIG. 3 is a flow chart of a procedure for forming an amorphous metal hydroxide mixture that can be used in the procedure of FIG. 1.

Like reference symbols in the various drawings indicate like elements.

DETAILED DESCRIPTION

Figure 4:
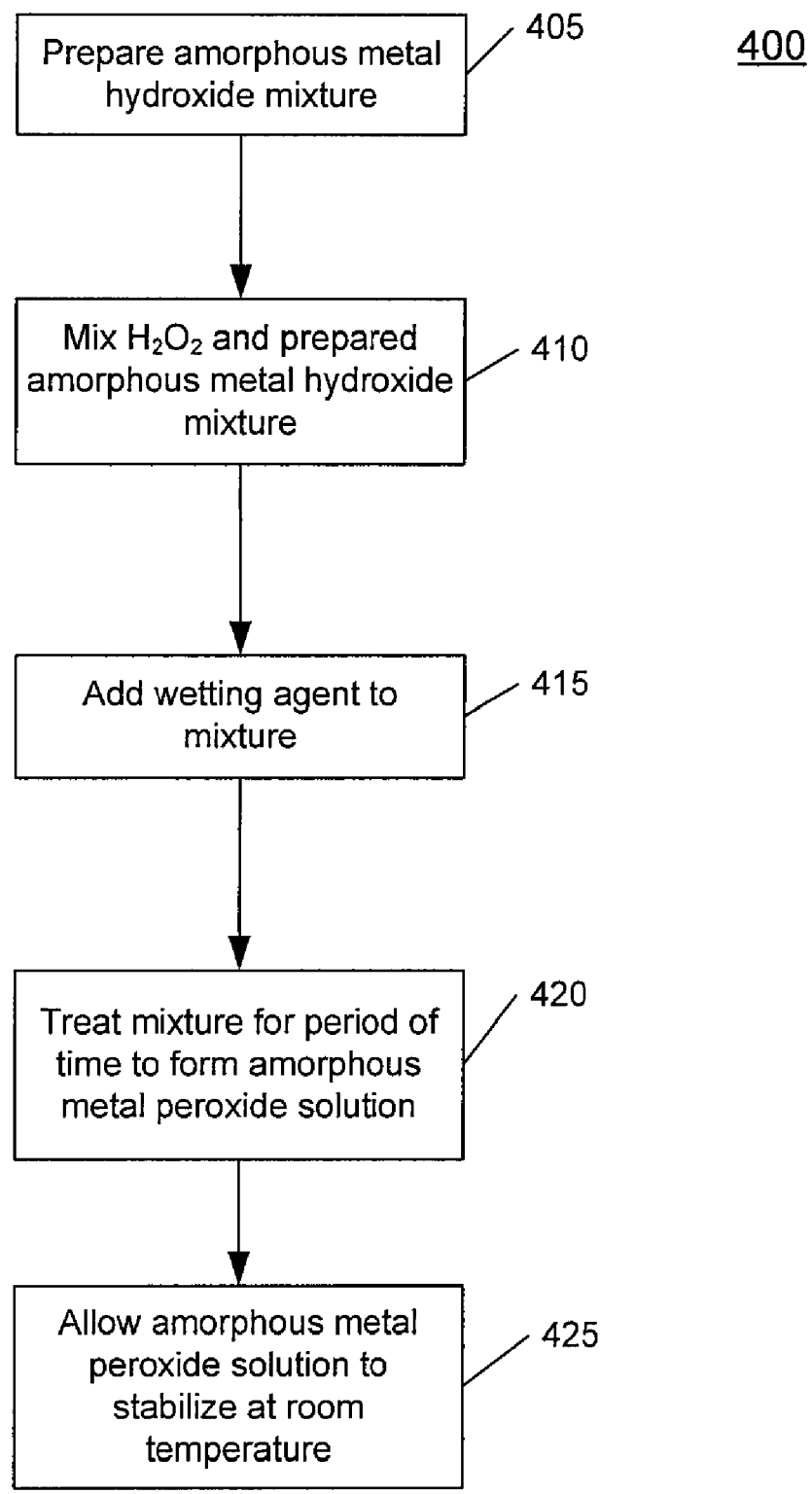
FIG. 4 is a flow chart of a procedure for forming an amorphous metal peroxide solution that can be used in the procedure of FIG. 1.

When a metal oxide such as anatase titanium oxide $TiO_2$ is illuminated by ultraviolet light having a wavelength below about 390 nm, electrons in the valence band are excited to the conduction band leaving behind positively-charged holes that are reactive with absorbed water vapor hydroxide ions, resulting in the formation of positively-charged hydroxyl radicals. The hydroxyl radicals are strong oxidizing radicals that can react with and strip electrons from the organic pollutants to produce simpler, non-offensive products such as $CO_2$ and $H_2O$. Because of these properties, anatase titanium oxide is used in photocatalytic coatings that are applied to surfaces to react with and decompose the organic pollutants deposited upon the surface from the environment under the effects of exposure to sunlight, and in particular, to ultraviolet radiation. The non-offensive products produced on the surface from the reaction with the anatase titanium oxide can re-enter the atmosphere or wash away under the effects of heat, wind, or rain.

Referring to FIG. 1, a procedure 100 is performed for producing an anatase metal oxide solution. In one implementation, the anatase metal oxide solution is a titanium oxide $TiO_2$ mixture. Other types of metal oxide solution that can be produced using the procedure 100 include, for example, $ZrO_2$, $ZnO$, $SrTiO_3$, $CdS$, $CdO$, $CaP$, $Inp$, $In_2O_3$, $CaAs$, $BaTiO_3$, $K_2NbO_3$, $Fe_2O_3$, $Ta_2O_5$, $WO_3$, $SaO_2$, $Bi_2O_3$, $NiO$, $Cu_2O$, $SiC$, $SiO_2$, $MoS_2$, $MoS_3$, $InPb$, $RuO_2$, $CeO_2$, and the like. The anatase metal oxide solution can be a sol or a powder. The produced anatase metal oxide solution can be used as a photocatalytic material that can be applied as a coating to many different kinds of substrate surfaces and/or can be integrated within many different kinds of substrates. Integration within a substrate includes dispersion of the photocatalytic material within the substrate such that the photocatalytic material is distributed more or less evenly throughout the substrate. For example, if the substrate is cement, the photocatalytic material can be mixed into the dry cement before liquid is added to the cement. As another example, the photocatalytic material can be mixed into the molten material that will form glass prior to cooling so that the photocatalytic material is dispersed within the glass.

Examples of substrates include metals, glass, polymeric materials, textiles, building materials such as concrete and vinyl, ceramics, pigments and fillers, fiber materials, electronics, carbon, graphite, plastics, resin materials, inorganic materials, organic materials, wood, paper, waste, skin, hair, and in particular, substrates and surfaces such as surgical steel, stainless steel, medical devices, Delrin® acetal resin, Kevlar® brand fiber, polycarbonate, fiberglass, cement, and anodized aluminum.

Initially, an amorphous metal peroxide solution is prepared (step 105). The amorphous metal peroxide solution is a metal peroxide solution that is amorphous (that is, non-crystalline). The amorphous metal peroxide solution is typically not photocatalytic, but is used as a precursor to produce the photocatalytic anatase metal oxide solution, as will described later. The amorphous metal peroxide solution can be stored at room temperatures over a long time for use later, and the solution will not form the photocatalytic anatase metal oxide solution unless treated, as further discussed below. The amorphous metal peroxide solution can be applied to a surface, and then later treated to form the photocatalytic anatase metal oxide solution. The anatase metal oxide solution is prepared using the amorphous metal peroxide solution (step 110). Next, the anatase metal oxide solution can be applied (by, for example, coating, spraying, or drying) to any suitable surface as a photocatalytically-active metal oxide (step 115). Each of these steps is described in greater detail below with reference to FIGS. 2-4.

Referring to FIG. 2, in one implementation, a procedure 200 is performed for preparing the amorphous metal peroxide solution (step 105). Initially in the procedure 200, an amorphous metal hydroxide mixture is prepared (205).

Referring to FIG. 3, a procedure 300 can be performed to prepare the amorphous metal hydroxide mixture. Initially, an alkali hydroxide (such as aqueous ammonia or sodium hydroxide) is added to an aqueous solution of a salt including the metal to form a metal hydroxide (step 305). Agitation can be applied during the mixing of the two components. For example, if the metal is titanium, then the salt solution can be titanium tetrachloride $TiCl_4$ (which can be purchased, for example, from Alfa Aesar) and the aqueous ammonia can be a solution of ammonium hydroxide $NH_4OH$ (which can be purchased, for example, from Alfa Aesar). In this example, HCl (36-38%) is mixed into distilled or deionized water $H_2O$ at a ratio of 1:10; $TiCl_4$ (98%) is mixed into the distilled or deionized $H_2O$/HCl solution at a ratio of 1:25 to form a $TiCl_4$ dilution; $NH_4OH$ (28-30%) is mixed into distilled or deionized $H_2O$ at a ratio of 1:10 to form a $NH_4OH$ dilution; and the $TiCl_4$ dilution is mixed into the $NH_4OH$ dilution by volume of 7:1 for pH neutralization to form the titanium hydroxide $Ti(OH)_4$. Neutralization is finished once the pH of the mixture is adjusted to 7.2-7.5. The pH of the mixture is adjusted by adjusting the relative amounts of components of the mixture and the pH can be checked, for example, with a pH meter. At this point, the amorphous metal hydroxide mixture can be allowed to stand for a while and any supernatant liquid can be discarded.

Next, the amorphous metal hydroxide mixture is washed (for example, by decantation or filtration) and separated from the chlorine ions in the mixture (step 310). The metal hydroxide mixture can be washed and separated by adding distilled water to the mixture, applying sufficient agitation to the mixture, allowing the mixture to stand, and discarding any supernatant liquid. Washing is repeated until little or no chlorine ions are detected in the supernatant liquid (for example, by using by using silver nitrate to measure levels of chlorine ions in the supernatant liquid or by using a chlorine ion probe). In some implementations, washing can be repeated until the amount of chlorine ions in the supernatant liquid is less than about 5 parts per million (ppm). In some cases, the mixture also can be subjected to centrifugal dehydration.

Additionally, water can be re-added to the mixture at this step or at later steps in suitable amounts to adjust the density of the mixture (the density being related to the amount of solid dispersed within the water). The density of the mixture can be adjusted depending on the surface or substrate to which the solution will be applied. For example, for porous or absorbent surfaces or substrates such as concrete, the density of the mixture can be relatively higher and for non-porous or non-absorbent surfaces or substrates such as glass, the density of the mixture can be relatively lower. The density of the mixture can impact the response time of the photocatalytic reaction. As the density of the mixture goes up, the thickness of the film build goes up.

Referring again to FIG. 2, next, hydrogen peroxide $H_2O_2$ (30%) is added at a ratio of 1:14 to the amorphous metal hydroxide mixture (step 210). A wetting agent or combination of agents can be added to the mixture at this time (step 215). The wetting agent can be used to alleviate the non-wettability or hydrophobic nature of the metal peroxide mixture that will be formed in the next step. In this way, a thinner film of the metal peroxide mixture can be applied to a surface. Thinner films have reduced yellow appearance and reduced moiré patterns, and reduced cure times. In one implementation in which the amorphous metal hydroxide mixture is a titanium hydroxide mixture, the wetting agent is a polyethylene oxide silane. In other implementations, the wetting agent can be isopropyl alcohol (IPA). The amount of wetting agent added to the mixture can be adjusted depending on the type of substrate or surface to which the ultimate solution will be applied and depending on the metal used in the solution. For example, as little as 0.005% (per volume of mixture) of wetting agent can be added to the mixture for applications in which the substrate or surface is highly water absorbent (for example, for concrete). As another example, as much as 0.03% (per volume of mixture) of wetting agent be added to the mixture for applications in which the substrate or surface that has a low surface tension or is highly water repellant (for example, for glass or polished metals).

Next, the mixture of the wetting agent, the hydrogen peroxide, and the metal hydroxide is heated simultaneously with being pressurized to a pressure that is above atmospheric pressure in combination with a suitable level of agitation for a suitable period of time until the amorphous metal peroxide solution is formed (step 220). Atmospheric pressure is the pressure at any point in the atmosphere local to the mixture due solely to the weight of the atmospheric gases above the mixture. The temperature at which the mixture is heated can depend on several factors, including the type of metal used in the mixture and constraints associated with manufacturing (for example, if the temperature needs to be lowered due to manufacturing limitations, then the time can be increased by a suitable amount). For example, a mixture of titanium hydroxide and hydrogen peroxide having a volume of about 2 liters can be heated to between about 90° C. to about 250° C. for about 1½ to 2 hours at 10 to 100 pounds per square inch (psi). For larger volumes of the mixture, for example, as used in manufacturing, the pressure can be suitably higher, for example, up to 2500 psi.

The level of agitation can be any level that provides enough agitation to disassociate the ions of the mixture and form the amorphous metal peroxide mixture. For example, the level of agitation can be between about 500 to about 10,000 rotations per minute (rpm) depending on the volume of the mixture. In some implementations, the level of agitation is between about 2500 to about 7000 rpm. During the heating and pressure application step, the mixture is monitored for temperature and pH levels to ensure that the mixture results in a completed solution in which the components (that is, the wetting agent, the hydrogen peroxide, and the metal hydroxide) are uniformly distributed throughout the mixture and to avoid forming a coagulated mixture.

After the amorphous metal peroxide solution is formed (step 220), it is allowed to cool to room temperature (step 225). The time to cool the solution can vary depending on the quantity of solution formed, the temperature at which the mixture was heated, and the metal used in the metal hydroxide. In some implementations, cooling can take between one to several hours.

The amorphous metal peroxide solution that is made (step 105) has about a 95-97% light transmissiveness. Thus, it appears clear to the human eye. Moreover, the density of the solution (that is, the amount of solid dispersed in solution) can be anywhere between 0.5 to about 2.0%, depending on the application in which the solution will be used.

Referring again to FIG. 1, after the amorphous metal peroxide solution is made (step 105), the anatase metal oxide solution is made from the amorphous metal peroxide solution (step 10). To make the anatase metal oxide solution, the amorphous metal peroxide solution is heated under a pressure that is above atmospheric pressure for a period of time until anatase metal oxide solution is formed. Agitation can be applied to the solution during the heating and pressure application. In particular, as the metal peroxide solution is heated, the peroxide begins to break down and the metal oxide units are allowed to combine into their natural crystalline states. The levels of the temperature and pressure can be adjusted depending on the quantity of solution and the type of metal in the solution. For example, 1-5 liters of amorphous titanium peroxide can be heated to between about 90° C. to about 250° C. under 10-100 psi of pressure for about 3 hours until anatase metal oxide solution is formed. As the amorphous titanium peroxide is heated under pressure, it turns a clear transparent and becomes crystallized to form the anatase metal oxide solution. Anatase particles of titanium oxide can be formed in the range of 1-7 nm.

For a density of about 1.2-1.5% anatase metal oxide, the anatase metal oxide solution can have a light transmissiveness of about 87-93% and the solution appears clear to the human eye, and the human eye would be unable to detect yellow within the solution. In some implementation, the density of the anatase metal oxide solution (that is, the amount of solid dispersed in solution) can be anywhere between 0.5 to about 2.0%, depending on the application in which the solution will be used.

Referring to FIG. 4, in another implementation, a procedure 400 can be performed for making the amorphous metal peroxide solution (at step 105). Initially, an amorphous metal hydroxide is prepared (step 405) as is described in step 205 of the procedure 200 and as detailed in the procedure 300. Next, hydrogen peroxide $H_2O_2$ (30%) is added at a ratio of 1:14 to the amorphous metal hydroxide mixture (step 410). A wetting agent or combination of agents is added to the mixture at this time (step 415). The wetting agent can be used to alleviate the non-wettability or hydrophobic nature of the metal peroxide mixture that will be formed in the next step. In this way, a thinner film of the metal peroxide mixture can be applied to a surface. Thinner films have reduced yellow appearance and reduced moiré patterns, and reduced cure times. In one implementation in which the amorphous metal hydroxide mixture is a titanium hydroxide mixture, the wetting agent is a polyethylene oxide silane. In other implementations, the wetting agent can be IPA. As discussed above, the amount of wetting agent added to the mixture can be adjusted depending on the type of substrate or surface to which the ultimate solution will be applied and depending on the metal used in the solution. For example, as little as 0.005% (per volume of mixture) of wetting agent can be added to the mixture for applications in which the substrate or surface is highly water absorbent (for example, for concrete). As another example, as much as 0.03% (per volume of mixture) of wetting agent be added to the mixture for applications in which the substrate or surface that has a low surface tension or is highly water repellant (for example, for glass or polished metals).

Next, the mixture of the wetting agent, the hydrogen peroxide, and the metal hydroxide is treated for a period of time until amorphous metal peroxide solution is formed (step 420). For example, one way to treat the mixture of the wetting agent, the hydrogen peroxide, and the metal hydroxide is to heat the mixture simultaneously with being pressurized to a pressure that is above atmospheric pressure in combination with a suitable level of agitation for a suitable period of time until the amorphous metal peroxide solution is formed, as described above with respect to step 220. Another way to treat the mixture is to cool the mixture to 5° C. for about 24 hours while applying agitation, as described in U.S. Pat. No. 6,429,169.

After the amorphous metal peroxide solution is formed (step 420), it is allowed to reach room temperature (step 425) by either cooling down or heating up, depending on how the mixture was treated at step 420.

Other implementations are within the scope of the following claims.

What is claimed is:

1. A method of making amorphous metal peroxide solution, the method comprising:
   mixing hydrogen peroxide and an amorphous metal hydroxide mixture to form a hydrogen peroxide and amorphous metal hydroxide mixture; and
   simultaneously heating and applying pressure above atmospheric pressure to the hydrogen peroxide and amorphous metal hydroxide mixture for a period of time to form the amorphous metal peroxide solution.

2. The method of claim 1, further comprising preparing the amorphous metal hydroxide mixture.

3. The method of claim 2, wherein preparing the amorphous metal hydroxide mixture comprises:
   mixing aqueous ammonia and a salt solution of the metal to form an amorphous metal hydroxide; and
   washing and separating the amorphous metal hydroxide.

4. The method of claim 1, further comprising adding a wetting agent to the hydrogen peroxide and amorphous metal hydroxide mixture prior to the simultaneous heating and application of pressure to form a hydrogen peroxide/amorphous metal hydroxide/wetting agent mixture.

5. The method of claim 1, wherein simultaneously heating and applying pressure above atmospheric pressure includes heating the hydrogen peroxide and amorphous metal hydroxide mixture to a temperature between about 90° C. and about 250° C.

6. The method of claim 1, further comprising agitating the hydrogen peroxide and amorphous metal hydroxide mixture simultaneously with heating and applying pressure to the hydrogen peroxide and amorphous metal hydroxide mixture.

7. The method of claim 1, wherein:
   the amorphous metal peroxide solution is amorphous titanium peroxide solution;
   the amorphous metal hydroxide mixture is an amorphous titanium hydroxide mixture; and
   simultaneously heating and applying pressure above atmospheric pressure to the hydrogen peroxide and amorphous metal hydroxide mixture for a period of time includes simultaneously heating to a temperature between about 90° C. and about 250° C. and applying pressure for about 1 ½-2 hours to form the amorphous titanium peroxide solution.

8. The method of claim 1, further comprising monitoring a temperature of the hydrogen peroxide and amorphous metal hydroxide mixture while simultaneously heating and applying pressure above atmospheric pressure to the hydrogen peroxide and amorphous metal hydroxide mixture for a period of time.

9. The method of claim 1, further comprising monitoring a pH level of the hydrogen peroxide and amorphous metal hydroxide mixture while simultaneously heating and applying pressure above atmospheric pressure to the hydrogen peroxide and amorphous metal hydroxide mixture for a period of time.

10. A method of making amorphous metal peroxide solution, the method comprising:
    mixing hydrogen peroxide, an amorphous metal hydroxide mixture, and a wetting agent to form a hydrogen peroxide/amorphous metal hydroxide/wetting agent mixture; and simultaneously heating and applying pressure above atmospheric pressure to the hydrogen peroxide/amorphous metal hydroxide/wetting agent mixture to form the amorphous metal peroxide solution.

11. The method of claim 10 further comprising agitating the hydrogen peroxide/amorphous metal hydroxide/wetting agent mixture simultaneously with heating and applying pressure.

12. The method of claim 10, further comprising preparing the amorphous metal hydroxide mixture.

13. The method of claim 12, wherein preparing the amorphous metal hydroxide mixture comprises:
    mixing aqueous ammonia and a salt solution of the metal to form an amorphous metal hydroxide; and
    washing and separating the amorphous metal hydroxide.

14. The method of claim 10, wherein:
    the amorphous metal peroxide solution is amorphous titanium peroxide solution;
    the amorphous metal hydroxide mixture is an amorphous titanium hydroxide mixture; and
    simultaneously heating and applying pressure above atmospheric pressure to the hydrogen peroxide/amorphous metal hydroxide/wetting agent mixture for a period of time to form the amorphous metal peroxide solution includes simultaneously heating to a temperature between about 90° C. and about 250° C. and applying pressure for about 1 ½-2 hours to form the amorphous titanium peroxide solution.

15. A method of making a photocatalytic anatase metal oxide solution, the method comprising:
    preparing amorphous metal peroxide solution; and
    simultaneously heating and applying pressure above atmospheric pressure to the prepared amorphous metal peroxide solution for a period of time to form the anatase metal oxide solution.

16. The method of claim 15, wherein preparing the amorphous metal, peroxide solution comprises:
    mixing hydrogen peroxide and a prepared amorphous metal hydroxide mixture to form a hydrogen peroxide and amorphous metal hydroxide mixture; and
    simultaneously heating and applying pressure above atmospheric pressure to the hydrogen peroxide and amorphous metal hydroxide mixture for a period of time to form the amorphous metal peroxide solution.

17. The method of claim 16, further comprising preparing the amorphous metal hydroxide solution.

18. The method of claim 15, wherein preparing the amorphous metal peroxide solution comprises:
    preparing an amorphous metal hydroxide mixture;
    mixing hydrogen peroxide and the prepared amorphous metal hydroxide to form a hydrogen peroxide and amorphous metal hydroxide mixture; and
    treating the hydrogen peroxide and amorphous metal hydroxide mixture to form the amorphous metal peroxide solution.

19. The method of claim 18; wherein treating the hydrogen peroxide and amorphous metal hydroxide mixture comprises simultaneously heating and applying pressure above atmospheric pressure to-the hydrogen peroxide and amorphous metal hydroxide mixture for a period of time to form the amorphous metal peroxide solution.

20. The method of claim 18, further comprising adding a wetting agent to the hydrogen peroxide and amorphous metal hydroxide mixture prior to treating.

21. The method of claim 20, wherein-treating the hydrogen peroxide and amorphous metal hydroxide mixture comprises simultaneously heating and applying pressure above atmospheric pressure to the hydrogen peroxide and amorphous metal hydroxide mixture for a period of time to form the amorphous metal peroxide solution.

22. The method of claim 15, wherein:
    the amorphous metal peroxide solution is an amorphous titanium peroxide solution, and
    the anatase metal oxide solution is anatase titanium oxide solution.

23. The method of claim 22, wherein simultaneously heating and applying pressure above atmospheric pressure to the prepared amorphous titanium peroxide solution for a period of time to form the anatase titanium oxide solution comprises heating the prepared amorphous titanium peroxide solution to a temperature Between about 90° C. and about 250° C. under the applied pressure until the anatase titanium oxide solution is formed.

24. A method of applying a photocatalytic anatase metal oxide solution to a substrate, the method comprising:
    making an amorphous metal peroxide solution including simultaneously heating and applying pressure above atmospheric pressure to a hydrogen peroxide and amorphous metal hydroxide mixture for a period of time to form the amorphous metal peroxide solution;
    forming a photocatalytic anatase metal oxide solution from the amorphous metal peroxide, solution, and
    applying the photocatalytic anatase metal oxide solution to the substrate.

25. The method of claim 24, wherein applying the photocatalytic anatase metal oxide solution to the substrate includes applying the photocatalytic anatase metal oxide solution as a coating to a surface of the substrate.

26. The method of claim 24, wherein applying the photocatalytic anatase metal oxide solution to the substrate includes integrating the photocatalytic anatase, metal oxide solution within the substrate.

27. The method of claim 26, wherein integrating the photocatalytic anatase metal oxide solution within the substrate includes dispersing the photocatalytic anatase metal oxide solution within the substrate such that the anatase metal oxide solution is distributed throughout the substrate.

* * * * *

UNITED STATES PATENT AND TRADEMARK OFFICE
CERTIFICATE OF CORRECTION

PATENT NO. : 7,659,226 B2                                                                                Page 1 of 1
APPLICATION NO. : 11/679058
DATED : February 9, 2010
INVENTOR(S) : Gary D. Tucker, II It is certified that error appears in the above-identified patent and that said Letters Patent is hereby corrected as shown below:

Column 9, lines 16-24, delete "10. A method of making amorphous metal peroxide solution, the method comprising:
mixing hydrogen peroxide, an amorphous metal hydroxide mixture, and a wetting agent to form a hydrogen peroxide/amorphous metal hydroxide/wetting agent mixture; and simultaneously heating and applying pressure above atmospheric pressure to the hydrogen peroxide/amorphous metal hydroxide/wetting agent mixture to form the amorphous metal peroxide solution." and insert --10. A method of making amorphous metal peroxide solution, the method comprising:
mixing hydrogen peroxide, an amorphous metal hydroxide mixture, and a wetting agent
    to form a hydrogen peroxide/amorphous metal hydroxide/wetting agent mixture; and
simultaneously heating and applying pressure above atmospheric pressure to the
    hydrogen peroxide/amorphous metal hydroxide/wetting agent mixture to form the
    amorphous metal peroxide solution.--, therefor.

Column 9, line 57, delete "metal," and insert --metal--, therefor.

Column 10, line 12, delete "18;" and insert --18,--, therefor.

Column 10, line 15, delete "to-the" and insert --to the--, therefor.

Column 10, line 21, delete "wherein-treating" and insert --wherein treating--, therefor.

Column 10, line 37, delete "Between" and insert --between--, therefor.

Column 10, line 48, delete "peroxide," and insert --peroxide--, therefor.

Column 10, line 57, delete "anatase," and insert --anatase--, therefor.

Signed and Sealed this

Twentieth Day of April, 2010

David J. Kappos
*Director of the United States Patent and Trademark Office*